3,349,051
POLYESTER RESIN MODIFIED BITUMINOUS COMPOSITIONS
Stephen H. Alexander, St. Louis, Mo., and Stewart R. Montgomery, Silver Spring, Md., assignors to Monsanto Company, a corporation of Delaware
No Drawing. Filed Jan. 9, 1964, Ser. No. 336,635
5 Claims. (Cl. 260—28.5)

ABSTRACT OF THE DISCLOSURE

A cured polyester resin modified bituminous composition prepared by mixing 10 to 60% by weight of a bitumen, 15 to 70% by weight of an unsaturated polyester resin and 10 to 45% by weight of a solvent which is a substituted aromatic hydrocarbon having ethylenically unsaturated substituents and which is a cross-linking agent for the polyester resins.

---

The present invention relates to polyester resin modified bituminous compositions. Particularly the present invention relates to compositions comprised of bituminous materials and polyester resins prepared from a bitumen, an unsaturated polyester resin and a particular cross-linking material.

The use of polyester resins as casting and laminating compositions is well known, however, the cost of producing the polyester resins and their use in casting and laminating is prohibitive of many specific end uses. As in any other situation where a relatively expensive material is in use, there is a constant search for methods of producing the material more economically or for less expensive materials possessing the same or similar properties.

It is an object of the present invention to provide new and novel polyester resin modified bituminous compositions. Another object of the present invention is to provide a method for preparing new and novel polyester resin modified bituminous compositions. It is another object of the present invention to provide polyester resin modified bituminous compositions and a method for their preparation, which are useful as casting and laminating compositions. Additional objects will become apparent from the following description of the invention herein disclosed.

The present invention which fulfills these and other objects comprises a composition comprising a polyester resin modified bitumen prepared from 10 to 60 percent y weight of a bitumen, 15 to 70 percent by weight of an unsaturated polyester resin and 10 to 45 percent by weight of a solvent for said bitumen and said polyester resin which is also a cross-linking agent for said polyester resin, said solvent comprising an aromatic hydrocarbon having ethylenically unsaturated substituents.

These compositions are prepared by intimately mixing the bitumen, unsaturated polyester resin and solvent and curing. This method of preparation and the compositions resulting therefrom are unique in that the solvent for both the polyester resin and bitumen also serves as a cross-linking agent for the polyester resin, thereby eliminating the need of high temperature mixing and curing. The solvent becomes a part of the cured composition. Of course, such composition is much more fire-resistant than an ordinary polyester resin modified bituminous composition using ordinary cutback solvents for the asphalt.

The term "bitumen" is used herein in a broad generic sense to include the various natural and synthetic asphalts, tars, and pitches. For instance, various natural asphalts may be used such as natural Trinidad, Bermudea, gilsonite, grahamite and Cuban, etc. Various petroleum asphalts may be used such as those obtained from California crudes, Smackover Arkansas crudes, Mid-Continental air-blown oils, Mexican petroleum asphalts, as well as tarry residues known as cracked asphalts obtained as a by-product during the cracking of gas oil or other heavier petroleum fractions to obtain gasoline or other lighter fractions, etc. Still further bituminous materials may be used such as coal tar, wood tar, petroleum pitches, and pitches obtained from various industrial processes, such as a fatty acid pitch, etc.

The bitumen of the present invention may have been subjected to any of the commonly used refining or treating processes, such as distillation, steam reduction, air-blowing, air-blowing with catalyst, solvent extraction, etc. The invention may also be applied to the use of asphalt or other bituminous materials in a cutback condition, i.e., dissolved in a volatile solvent such as kerosene, toluene, petroleum aromatic solvent fraction, benzene. However, since it is a primary advantage of the present invention that cutback solvents are not necessary, seldom will cutback asphalts be used.

The useful bitumens are described in the book, The Properties of Asphaltic Bitumen by J. Ph. Pfeiffer, particularly as defined on pages 4–7. Also, the useful bitumens of this invention are described in the book, Asphalts and Allied Products, fifth edition, by Herbert Abraham. A class of tars may be used such as those defined in U.S. Patent 2,921,919. A particularly useful class of asphalts are the petroleum asphalts, either as a soft, petroleum residuum or as a hard, petroleum residuum which may be further processed by air-blowing, catalytic air-blowing, and solvent extraction, e.g., propane extraction, of still residues.

Another description of bitumens which are useful in the practice of this invention may be found in "Science of Petroleum," volume 4, pages 2690–2759.

The unsaturated polyester resins used in the present invention are prepared from the polycondensation of an unsaturated dibasic acid with a polyhydric alcohol. The expression "dibasic acid" as used herein includes available similarly reacting anhydrides. Among the bibasic acids are such unsaturated acids as maleic, fumaric, aconitic, itaconic, citraconic, mesaconic, chloromaleic, carbic, etc., acids. Substantial amounts of non-polymerizable acids may also be used, but the polymerizable unsaturated acids should be present in an amount of approximately at least 5% by weight of the total weight of the dibasic acids used and frequently in amounts varying between about 25% and 65% by weight based on the total weight of dibasic acids present. Examples of non-polymerizable polycarboxylic acids include phthalic, oxalic, malonic, succinic, glutaric, sebacic, adipic, pimelic, suberic, azelaic, tricarballylic, citric, tartaric and malic acids.

Among the polyhydric alcohols suitable for reaction with dibasic acids to prepare the unsaturated polyester resins of the present invention are ethylene glycol, propylene glycol, dipropylene glycol, trimethylene glycol, tetramethylene glycol, pinacol, arabitol, xylitol, dulcitol, adonitol, mannitol, glycerol, trimethylol propane, trimethylol ethane, sorbitol, 1,1'-isopropylidene bis(p-phenylenoxy) di-2-propanol, pentaerythritol, dipentaerythritol, and alkanediols as exemplified by butanediol-1,2, butanediol-1,3, butanediol-1,4, pentanediol-1,2, pentanediol-1,4, pentanediol-1,5, hexanediol-1,6, and the like. It is usually desirable that a dihydric alcohol be employed in major proportion relative to any alcohols containing more than two hydroxy groups which may be used in forming the polyester.

In preparation of the polymerizable unsaturated polyesters, one may use the polyhydric alcohols and the dibasic acids in substantially equimolar proportions but an excess of alcohol approximating 10 or 15% above the stoichiometric quantity required for complete esterification of the acid is preferred. When a polyhydric alcohol containing more than two hydroxy groups or a dibasic acid having more than two carboxyl groups is used, the proportions of reactants should be adjusted accordingly to provide for esterification of these additional reactive groups. The alcohol and acid should be reacted sufficiently to produce an ultimate polyester resinous material having an acid number not greater than about 55 and preferably an acid number from about 5 to about 40.

The third component of the compositions of the present invention is a solvent for the bitumen and the unsaturated polyester resins. The solvent must also be a cross-linking agent for the polyester resins. Suitable solvents for use in the present invention are the aromatic hydrocarbons having ethylenically unsaturated substituents. Among the compounds within this classification are the following non-limiting examples: styrene, o, m, and p-methylstyrenes, alpha-methylstyrenes, 2,4-di-methylstyrenes, 2,3-di-methylstyrenes, 2,5-di-methylstyrenes, alpha-ethylstyrene, o, m, and p-ethylstyrene, m-propylstyrene, iso-propenyltoluene, vinylnaphthalene, and the like. Generally, in the practice of the present invention it will be preferred to use either styrene or the methylstyrenes.

The compositions of the present invention are usually prepared by mixing 10 to 60 percent by weight bitumen, 15 to 70 percent by weight of an unsaturated polyester resin and 10 to 45 percent by weight of one of the above-described solvents. Preferably, however, the compositions of the present invention will be prepared from 15 to 50 parts by weight bitumen, 20 to 55 parts by weight of an unsaturated polyester resin and 15 to 35 parts by weight of one of the above cross-linking agents.

The compositions of this invention may be modified by the addition of any of the well-known fillers such as diatomaceous earth, silica gels, mica, slate flour, carbon black, metallic salts such as magnesium stearate, metallic powders such as aluminum pigment, china clay, milled and fibrous asbestos, vermiculite, etc. may be added to the compositions of this invention. The proportions of filler to bitumen-polyester resin will vary considerably depending upon the final use for the product. It is customary for the filler, if any, to be added in an amount ranging from 5 to 35% by weight based on the total weight of the composition.

Normally, the reactions forming the compositions of the present invention will take place at room temperatures. However, mixing may be improved by reducing the viscosity of the mixture through the application of heat. Further, the application of heat reduces the time necessary for curing in many instances. In some instances, it may be desirable to cool the mixtures to prevent premature reaction. Useful temperatures range from room temperature (70 to 75° F.) to 350° F. and higher, although the temperature will normally range from room temperature to 200° F. Likewise, the reaction or curing time is not critical and may range from a few minutes, e.g., 15 minutes, to several days, e.g., 4 days, and will obviously depend on process conditions, particularly temperature, and reactants. However, the more useful compositions of this invention may be reacted and cured in a period ranging from 1 to 24 hours.

In order to more rapidly obtain curing of the compositions of the present invention, it is often desirable to use as an initiator. Among the useful compounds for initiating the curing of the present composition are the organic peroxides and hydroperoxides. Such compounds are exemplified by methyl ethyl ketone peroxide, benzol peroxide, tertiary butyl hydroperoxide, lauroyl peroxide, cyclohexane peroxide, and the like. In using these initiators, generally no more than 5% by weight based on the weight of the total composition is used. To further accelerate the curing reaction, minor amounts of metallic naphthenates may be added. Such accelerating compounds are exemplified by the following non-limiting examples: cobalt naphthenate, lead naphthenate, magnesium naphthenate, and the like. The amount of accelerating agent used, if any, will generally be below 0.75% by weight of the total composition, preferably below 0.5% by weight.

In order to further describe and to illustrate the present invention, the following examples are offered. These examples are not to be construed as limiting the present invention.

EXAMPLE I

| Component: | Weight (gms.) |
|---|---|
| Unsaturated polyester resin A [1] | 13 |
| Styrene | 7 |
| Asphalt [2] | 10 |
| Cobalt naphthenate [3] | 0.08 |
| Methyl ethyl ketone peroxide [4] | 0.8 |

[1] This unsaturated polyester resin is one prepared by the polycondensation of a mixture of an unsaturated dibasic acid such as maleic acid and a saturated dibasic acid such as adipic acid with a polyhydric alcohol such as ethylene glycol. This material has the following properties: Viscosity at 77° F.—10 poise; specific gravity at 77° F.—1.05; percent polymerizable—100; acid number 8. This resin is known commercially as Plaskon 9600 and is obtained from Allied Chemical Co.
[2] This asphalt is an air-blown asphalt having a penetration at 77° F. of 35 and is obtained from air-blowing at 500° F. an asphalt obtained by steam and vacuum reduction of crude oil from the Smackover Field, Arkansas.
[3] Cobalt naphthenate is a high grade metallic soap prepared from cobalt and naphthenic acids. The metal content of this material is 6%. This compound is obtained from Modex Products Company.
[4] Methyl ethyl ketone peroxide is a liquid comprising a 60% solution of the peroxide in dimethyl phthalate. This material has the following properties: Color—water-white, specific gravity at 15 °C.—1.12, flashpoint above 45° C., decomposition temperature—mildly at 118–120° C. Insoluble in water, slightly soluble in petroleum solvents, and soluble in oxygenated organic solvents. The methyl ethyl ketone peroxide is obtained from Modex Products Company.

*Procedure.*—The unsaturated polyester resin was dissolved in styrene and the resulting solution mixed with molten asphalt at about 170° to 180° F. The mixture was then cooled to 77° F. and the cobalt naphthenate and methyl ethyl ketone peroxide added in this order. The material was cured in the absence of air overnight at room temperature. The resulting composition was flexible, tough, rubbery, and impervious to petroleum naphtha.

EXAMPLE II

| Component: | Weight (gms.) |
|---|---|
| Polyester resin B [5] | 7.8 |
| Styrene | 4.2 |
| Asphalt [6] | 8 |
| Methyl ethyl ketone peroxide | 0.5 |
| Methyl iso-butyl ketone | 3 |

[5] This is a linear unsaturated polyester resin prepared from maleic acid and ethylene glycol. It has the following properties: Color—pink, specific gravity at 77° F.—1.18. This material has the trade name Marcothix No. 9 and is obtained from Celanese Corporation of America.
[6] This asphalt is a propane extracted asphalt having a penetration of 4 mm./10 at 77° F.

*Procedure.*—This material was prepared in the same manner as that in Example I with the exception that it was cured in the presence of air. The final composition differed from that of Example I in that it was somewhat harder.

EXAMPLE III

| Component: | Weight (gms.) |
|---|---|
| Polyester resin C [7] | 13 |
| Styrene | 7 |
| Slate flour, 95% passing a 325 mesh sieve | 3.3 |
| Asphalt [8] | 10 |
| Methyl ethyl ketone peroxide | 0.8 |
| Cobalt naphthenate | 0.08 |

[7] A polyester resin which is supplied as a 65% solution in monomeric styrene. This resin has the following properties: Viscosity at 77° F.—600 centipoises; APHA color—max. 100; specific gravity at 77° F.—1.13; acid number, max. 32. This polyester resin is commercially known as Marcothix MR-28C and is obtained from Celanese Corporation of America.
[8] Same as used in Example I.

*Procedure.*—This polyester resin-asphalt formulation was prepared by dissolving the polyester resin in styrene and then mixing this solution with a molten asphalt in which slate flour had been dispersed. The resulting mixture was then cooled and the initiators added. The mixture was then cured to a hard, glossy solid by heating the mixture at 170° F. for 24 hours. It resisted the solvent action of petroleum naphtha.

EXAMPLE IV

| Component: | Weight (gms.) |
|---|---|
| Polyester resin B | 9 |
| Styrene | 5 |
| Asphalt [9] | 6 |
| Initiator [10] | 0.5 |

[9] A soft vacuum-steam reduced asphalt having a float at 122° F. of 110 seconds (ASTM D 139–49) which is obtained from Arkansas light crudes.
[10] A thick white paste consisting of 45% cyclohexanone peroxides suspended in dibutyl phthalate, known commercially as Luperco JDB–50T and obtained from Lueidol Division, Wallace and Tiernam, Inc.

*Procedure.*—A coating (40–50) mils thick was prepared as in Example I except that it was cured for 18 to 24 hours at 77° F. to a hard solid.

EXAMPLE V

| Component: | Weight (gms.) |
|---|---|
| Polyester resin D [11] | 3.3 |
| Styrene (approx.) | 5 |
| Polyester resin E [12] | 6.7 |
| Asphalt [13] | 10 |
| Methyl ethyl ketone peroxide | 0.8 |
| Cobalt naphthenate | 0.08 |

[11] This polyester resin is a clear liquid, slightly amber in color, the usual type of unsaturated polyester when dissolved in styrene. This resin has the following properties: Specific gravity at 75° F.—1.04; viscosity at 75° F.—60–70 centipoises. This polyester resin is known commercially as Vibrin 121 and is obtained from Naugatuck Chemical, a division of U.S. Rubber Co.
[12] This polyester resin is a clear amber liquid when dissolved in monomeric styrene. It is of the flame resistant type. It has the following properties: Viscosity at 75° F.—10 poises; specific gravity at 75° F.—1.314; refractive index, 25° C.—1.574; acid number—30. This polyester resin is known commercially as Vibrin 144D and is obtained from Naugatuck Chemical, a division of U.S. Rubber Co.
[13] Same as used in Example I.

*Procedure.*—This material was prepared as in Example I except it was cured in air for 24 to 48 hours at 77° F. to yield a hard, flexible, glossy solid approximately 40 to 50 mils thick.

Consideration of the above examples is believed to clearly demonstrate the advantages resulting from the present invention. In each case, compositions possessing the qualities of casting and laminating materials were obtained. Also, these compositions were shown to be obtainable by curing at relatively low temperatures, near normal room temperatures and also at elevated temperatures. These examples also clearly illustrate that the higher temperatures necessary for volatilizing asphalt cutback solvents are unnecessary in the practice of the present invention since the solvents of the present compositions do not have to be volatilized from the compositions.

What is claimed is:

1. A cured bituminous composition consisting essentially of a polyester resin-modified bituminous composition prepared by mixing 10 to 60 percent by weight of a bitumen, 15 to 70 percent by weight of an unsaturated polyester resin wherein said unsaturated polyester resin is one prepared by the polycondensation of a dibasic acid selected from the group consisting of maleic acid, fumaric acid, aconitic acid, itaconic acid, citraconic acid, and chloromaleic acid, and a polyhydric alcohol selected from the group consisting of ethylene glycol, propylene glycol, dipropylene glycol, and trimethylene glycol, and 10 to 45 percent by weight of a solvent comprising a substituted aromatic hydrocarbon having ethylenically unsaturated substituents, said solvent being a cross-linking agent for said polyester resins.

2. A composition according to claim 1 wherein the bitumen is an asphalt.

3. A composition according to claim 2 wherein the asphalt is a petroleum asphalt.

4. A composition according to claim 1 which has a filler incorporated therein.

5. A composition according to claim 1 wherein the substituted aromatic hydrocarbon is one selected from the group consisting of styrene, methylstyrenes, and combinations thereof.

References Cited

UNITED STATES PATENTS

| 1,955,355 | 3/1934 | Alvarado et al. | 260—28 |
| 2,851,379 | 9/1958 | Staudinger et al. | 260—862 |
| 3,077,424 | 2/1963 | Maker et al. | 260—861 |

MORRIS LIEBMAN, *Primary Examiner.*

JULIUS FROME, *Examiner.*

B. A. AMERNICK, *Assistant Examiner.*